United States Patent
Wang et al.

(10) Patent No.: US 12,535,178 B2
(45) Date of Patent: Jan. 27, 2026

(54) QUICK-RELEASE PLATE ASSEMBLY AND TRIPOD

(71) Applicant: SHENZHEN NEEWER TECHNOLOGY CO. LTD, Shenzhen (CN)

(72) Inventors: Jun Wang, Shenzhen (CN); Yan Ke, Shenzhen (CN)

(73) Assignee: SHENZHEN NEEWER TECHNOLOGY CO. LTD, Shenzhen (CN)

( * ) Notice: Subject to any disclaimer, the term of this patent is extended or adjusted under 35 U.S.C. 154(b) by 176 days.

(21) Appl. No.: 18/363,904

(22) Filed: Aug. 2, 2023

(65) Prior Publication Data

US 2025/0020268 A1   Jan. 16, 2025

(30) Foreign Application Priority Data

Jul. 12, 2023  (CN) .......................... 202321832093.5

(51) Int. Cl.
  *F16M 13/00*  (2006.01)
  *F16M 11/18*  (2006.01)
  *G03B 17/56*  (2021.01)

(52) U.S. Cl.
  CPC ........... *F16M 11/18* (2013.01); *G03B 17/561* (2013.01)

(58) Field of Classification Search
  None
  See application file for complete search history.

(56) References Cited

U.S. PATENT DOCUMENTS

| | | | | |
|---|---|---|---|---|
| 4,570,887 | A * | 2/1986 | Banister | F16M 11/041 248/223.41 |
| 6,196,504 | B1 * | 3/2001 | Lemke | F16M 11/041 396/428 |
| 9,188,274 | B2 * | 11/2015 | Schorman | F16M 11/043 |
| 2009/0308993 | A1 * | 12/2009 | Chang | F16B 47/00 248/176.3 |
| 2011/0157805 | A1 * | 6/2011 | Mi | G06F 1/1613 361/679.22 |
| 2011/0205426 | A1 * | 8/2011 | Kang | G03B 17/566 348/373 |
| 2013/0256484 | A1 * | 10/2013 | Kessler | F16M 13/00 248/224.7 |
| 2017/0037994 | A1 * | 2/2017 | Sakaguchi | F16M 11/045 |
| 2022/0269151 | A1 * | 8/2022 | Chan | G03B 17/561 |

* cited by examiner

Primary Examiner — Steven M Marsh
(74) Attorney, Agent, or Firm — Westbridge IP LLC

(57) ABSTRACT

Disclosed are a quick-release plate assembly and a tripod. The quick-release plate assembly is applied to a pan-tilt, including: a base and a quick-release plate. The base is provided with a sliding groove and a plurality of stopping portions, the sliding groove is penetrating through the base, each end of the sliding groove is provided with a protruding stopping portion. The quick-release plate slidably is arranged in the sliding groove, one side of the quick-release plate towards the sliding groove is provided with an abutting convex portion corresponding to two ends of the sliding groove, the quick-release plate can slide back and forth along the sliding groove, and the abutting convex portion can abut against the protruding stopping portion. At least one stopping portion is movably arranged on the base, to make the protruding stopping portion match a position of a corresponding abutting convex portion.

15 Claims, 18 Drawing Sheets

QUICK-RELEASE PLATE ASSEMBLY AND TRIPOD

CROSS-REFERENCE TO RELATED APPLICATIONS

This application claims priority to Chinese Patent Application No. 202321832093.5, filed on Jul. 12, 2023, the entire contents of which are incorporated herein by reference.

TECHNICAL FIELD

The present application relates to the technical field of photography auxiliary accessories, and in particular to a quick-release plate assembly and a tripod.

BACKGROUND

The quick-release plate is widely used in the field of photography as an assembly to quickly fix the camera on the pan-tilt. There is a dovetail groove for the quick-release plate to be installed on the pan-tilt. When the quick-release plate is installed in the dovetail groove, the quick-release plate can slide along the extending direction of the dovetail groove. Through the cooperation of the abutting convex portion on the quick-release plate and the stopping block in the dovetail groove, the moving range of the quick-release plate is limited within the dovetail groove to prevent the quick-release plate from falling.

Currently, there are different models and specifications of quick-release plates in the market. For different specifications of quick-release plates, different specifications of dovetail grooves are required. As a result, it is necessary to replace the pan-tilt with different specifications of dovetail grooves when installing quick-release plates of different specifications, which is inconvenient to use.

SUMMARY

The main purpose of the present application is to provide a quick-release plate assembly, aiming at adjusting the position of the stop block on a dovetail groove to adapt to quick-release plates of different specifications, so as to improve the convenience for users to use the quick-release plate assembly.

To achieve the above objective, the present application provides a quick-release plate assembly applied to a pan-tilt, including: a base and a quick-release plate; the base is provided with a sliding groove and a plurality of stopping portions, the sliding groove is penetrating through the base, each end of the sliding groove is provided with a protruding stopping portion; the quick-release plate is slidably arranged in the sliding groove, one side of the quick-release plate towards the sliding groove is provided with an abutting convex portion corresponding to two ends of the sliding groove, the quick-release plate is configured to slide back and forth along the sliding groove, and the abutting convex portion is configured to abut against the protruding stopping portion, and at least one stopping portion is movably arranged on the base, to make the protruding stopping portion match a position of a corresponding abutting convex portion.

In an embodiment, a bottom of the sliding groove is provided with a guiding straight groove extending along a width direction of the sliding groove, the stopping portion includes a first stopping portion passing through the guiding straight groove and is configured to move along an extending direction of the guiding straight groove, to match the position of the corresponding abutting convex portion.

In an embodiment, the quick-release plate assembly further includes: a sealing plate arranged on a side of the base away from the sliding groove; an accommodating space is formed between the sealing plate and the base, one end of the first stopping portion is limited in the accommodating space, and the other end of the first stopping portion passes through the guiding straight groove and protrudes from the sliding groove; and a side of the sealing plate towards the guiding straight groove is provided with a plurality of recesses, and the plurality of recesses are distributed at intervals along the extending direction of the guiding straight groove, an opening cavity is provided at one side of the first stopping portion towards the recess, a first elastic member is provided in the opening cavity, a limiting convex portion is movably provided at an opening of the opening cavity, two ends of the first elastic member are respectively abutted against a bottom of the opening cavity and the limiting convex portion, and the limiting convex portion is configured to be elastically clamped with any one of the recesses.

In an embodiment, a bottom of the sliding groove is provided with a scallop hole, the stopping portion includes a second stopping portion rotatably arranged in the scallop hole, a center of the scallop hole is located at a rotating axis of the second stopping portion, when abutted against two side edges of the scallop hole, the second stopping portion is configured to abut against the abutting convex portions at different positions.

In an embodiment, a first rotating shaft is provided on the base adjacent to the center of the scallop hole, the second stopping portion includes a main body portion and a rotating portion connected to the main body portion, the rotating portion is rotatably connected to the first rotating shaft at the side of the base away from the sliding groove, and the main body portion passes through the scallop hole and protrudes from the sliding groove.

In an embodiment, a plurality of avoiding holes are provided at a bottom of the sliding groove, and the plurality of avoiding holes are distributed at intervals along a width direction of the sliding groove, the stopping portion includes a plurality of third stopping portions, one of the third stopping portions is correspondingly telescopically inserted into one of the avoiding holes, at least one of the third stopping portions protrudes out of the avoiding hole to match the position of the corresponding abutting convex portion.

In an embodiment, the quick-release plate assembly further includes: a sealing plate arranged at the side of the base away from the sliding groove; an accommodating space is provided between the base and the sealing plate; and the third stopping portion is slidably connected to the sealing plate and/or the base at the avoiding hole, a second elastic member is provided between the third stopping portion and the sealing plate, two ends of the second elastic member are elastically abutted against the sealing plate and the third stopping portion respectively, to make the third stopping portion extend and retract in the avoiding hole.

In an embodiment, the quick-release plate assembly further includes: a rotating rod, a second rotating shaft is provided between the sealing plate and the base, and a middle part of the rotating rod is rotatably connected to the second shaft; the stopping portion includes two third stopping portions, and the two third stopping portions are respectively corresponding to the two ends of the rotating rod, and are respectively arranged at opposite ends of the rotating rod in a rotational circumferential direction of the rotating rod, the third stopping portion is provided with a first slot and a second slot distributed in a direction from the sealing plate to the base, the two ends of the rotating rod are protrudingly provided with clamping convex portions towards the third stopping portion in a rotating direction of the rotating rod, and a third elastic member is elastically abutted between a side of the rotating rod away from the clamping convex portion and the base and/or the sealing plate; when one of the clamping convex portions of the rotating rod is clamped into a first slot of the third stopping portion, the other one of the clamping convex portions is correspondingly clamped into a second slot of the other third stopping portion.

In an embodiment, the quick-release plate further includes a sealing plate arranged on the side of the base away from the sliding groove; and a clamping structure is provided on the base, an accommodating groove is formed between the base and the sealing plate, a communicating port is opened on a wall of the sliding groove, the sliding groove is communicated with the sliding groove through the communicating port, the clamping structure is arranged in the accommodating groove, and is configured to limit a position of the quick-release plate through the communicating port.

In an embodiment, the communicating port is provided with a first portion on the side wall of the sliding groove and a second portion on the bottom wall of the sliding groove, the clamping structure includes a limiting member arranged at the communicating port, the limiting member is provided with a first abutting portion accommodated in the first portion and a second abutting portion opposite to the second portion, an included angle is formed between the first abutting portion and the second abutting portion, and the limiting member is rotatably connected to the wall of the accommodating groove, to have a first state and a second state.

In an embodiment, the clamping structure further includes a pushing rod, a first resetting spring and a second resetting spring; one end of the pushing rod extends into the accommodating groove, and is configured to move in the accommodation groove; two ends of the first resetting spring elastically abut against an opposite side of the pushing rod and the opposite side of the wall of the accommodation groove respectively, an elastic expansion and retraction direction of the first resetting spring is parallel to moving direction of the pushing rod, and two ends of the second resetting spring elastically abut against the back side of the second abutting portion and the opposite side of the sealing plate respectively; and one side of the limiting member towards the pushing rod is provided with a first clamping portion, the pushing rod is provided with a second clamping portion and a third slot in sequence in the moving direction, and the second clamping portion is configured for abutting against the first clamping portion.

In an embodiment, a button is provided at the end of the pushing rod outside the accommodating groove, and the first clamping portion and the second abutting portion are respectively arranged at two opposite sides of a rotating shaft of the limiting member.

In an embodiment, the clamping structure further includes a locking member, the side of the second abutting portion towards the communicating port is provided with a limiting slope, one side of the locking member protrudes from the edge of the base and is configured to move in the accommodation groove, and the other end of the locking member is configured to move closer to press the limiting slope, to press the first abutting portion tightly on the quick-release plate.

In an embodiment, the locking member includes a top plate slidably connected to the base and a screw screwed to the side of the base, one end of the screw is connected with a knob, and the other end of the screw is configured for abutting against the top plate when the limiting member is in the first state, so that the top plate presses against the limiting slope.

The present application also provides a tripod, including a tripod body and the quick-release plate assembly; the quick-release plate assembly is arranged on a top of the tripod body.

In the technical solution of the present application, stopping portions are respectively provided at two ends of the sliding groove, and the stopping portion at the at least one end of the sliding groove can move in the base, so that the stopping portion protruding from the end of the sliding groove has different positions. When the stopping portion is protruded at a certain position at the end of the sliding groove, a certain specification of the quick-release plate can slide stably in the sliding groove, that is, the stopping portion protruding at this position is abutted against the abutting convex portion of the quick-release plate of this specification, and the quick-release plate slides to a limit position in the sliding groove. When the stopping portion is switched to protrude at another position at the end of the sliding groove, the quick-release plate of another specification can slide stably in the sliding groove, that is, the stopping portion at this position abuts against the abutting convex portion of the quick-release plate of this specification, and the quick-release plate slides to the limit position in the sliding groove. Similarly, the stopping portion at the other end of the sliding groove can also have different protruding positions. In this way, when switching quick-release plates of different specifications, the user does not need to replace the matching sliding groove on the pan-tilt, and the sliding groove can be adapted to a variety of standard quick-release plates, which improves the convenience for users to use the quick-release plate assemblies.

BRIEF DESCRIPTION OF THE DRAWINGS

In order to illustrate the technical solutions in the embodiments of the present application or in the related art more clearly, the following briefly introduces the accompanying drawings required for the description of the embodiments or the related art. Obviously, the drawings in the following description are only part of embodiments of the present application. For those of ordinary skill in the art, other drawings can also be obtained according to the structures shown in these drawings without any creative effort.

Figure 1:
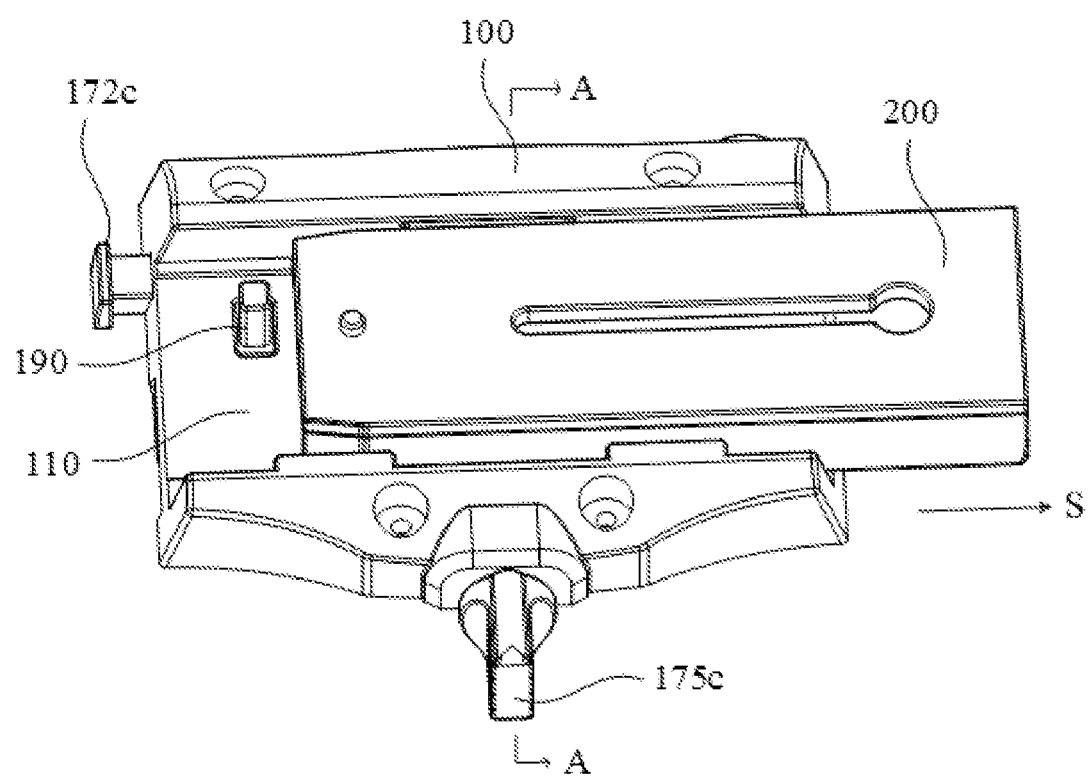
FIG. 1 is a schematic structural view of a quick-release plate assembly according to an embodiment of the present application.
Figure 2:
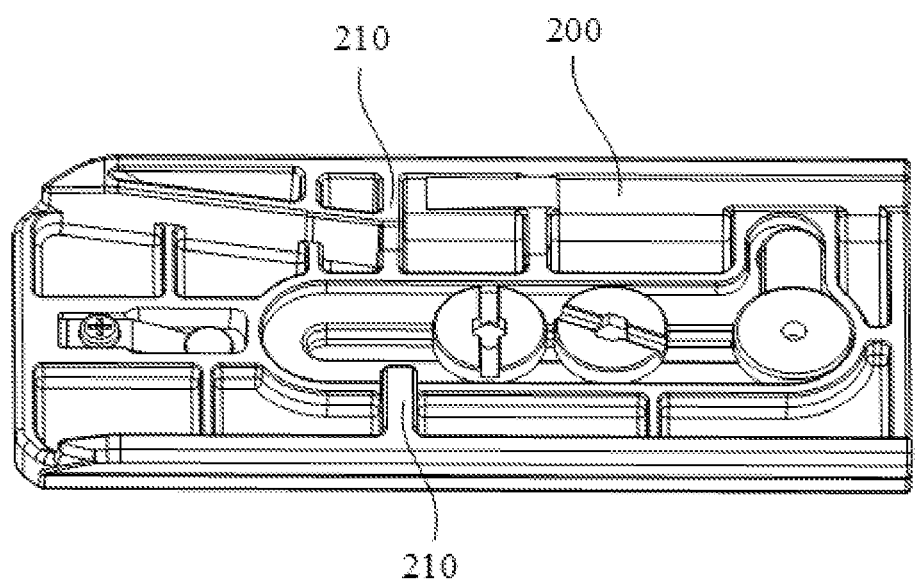
FIG. 2 is a schematic structural view of a back side of a quick-release plate in FIG. 1.
Figure 3:
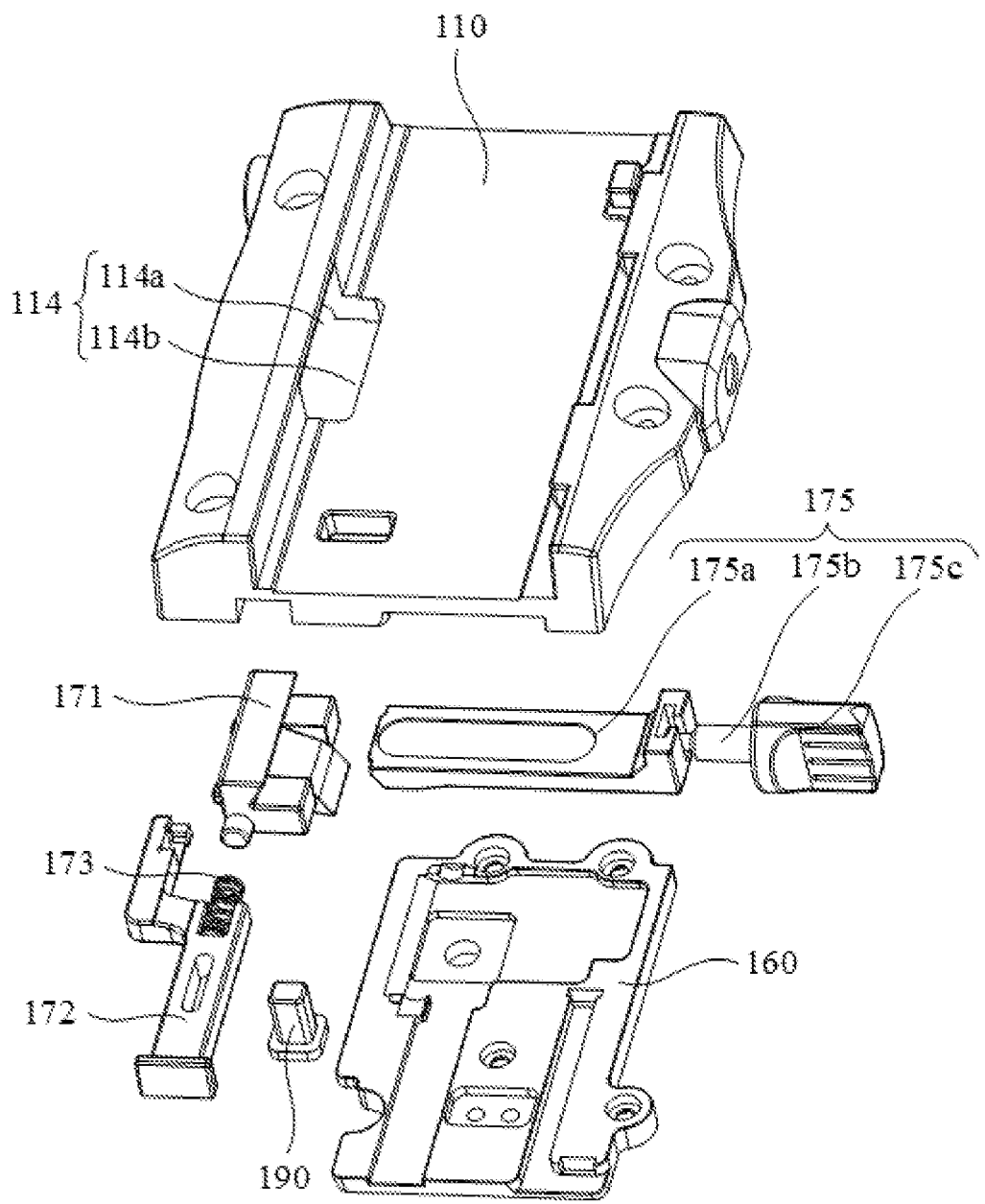
FIG. 3 is an explosion schematic view of a base in FIG. 1.
Figure 4:
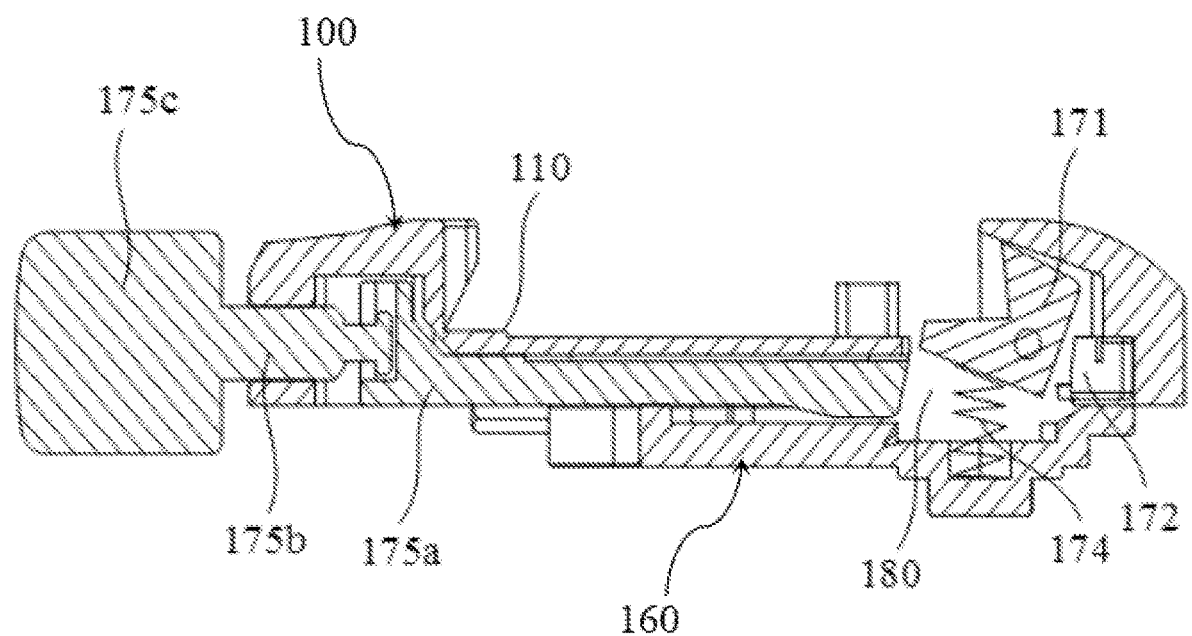
FIG. 4 is a sectional view of the base along A-A in FIG. 1.

The realization of the objective, functional characteristics, and advantages of the present application are further described with reference to the accompanying drawings.

DETAILED DESCRIPTION OF THE EMBODIMENTS

The technical solutions of the embodiments of the present application will be described in more detail below with reference to the accompanying drawings. It is obvious that the embodiments to be described are only some rather than all of the embodiments of the present application. All other embodiments obtained by persons skilled in the art based on the embodiments of the present application without creative efforts shall fall within the scope of the present application.

In addition, if there are descriptions related to "first", "second", etc. in the embodiments of the present application, the descriptions of "first", "second", etc. are only for the purpose of description, and should not be construed as indicating or implying relative importance or implicitly indicates the number of technical features indicated. Thus, a feature delimited with "first", "second" may expressly or implicitly include at least one of that feature. Besides, the meaning of "and/or" appearing in the application includes three parallel scenarios. For example, "A and/or B" includes only A, or only B, or both A and B. In addition, the technical solutions between the various embodiments can be combined with each other, but must be based on the realization by those of ordinary skill in the art. When the combination of technical solutions is contradictory or cannot be realized, it should be considered that the combination of such technical solutions does not exist or fall within the scope of protection claimed in this application.

This application provides a quick-release plate assembly.

In an embodiment, referring to FIG. 1 to FIG. 19, the quick-release plate assembly is applied to the pan-tilt, including: a base 100 and a quick-release plate 200.

The base 100 is provided with a sliding groove 110, the sliding groove 110 is penetrating through the base 100, the base 100 is provided with a plurality of stopping portions 190, and each end of the sliding groove 110 is provided with a stopping portion 190.

The quick-release plate 200 is slidably arranged in the sliding groove 110, a side of the quick-release plate 200 facing the sliding groove 110 is provided with abutting convex portions 210 corresponding to two ends thereof, the quick-release plate 200 slides back and forth along the sliding groove 110, and the abutting convex portion 210 can correspondingly abut against the protruding stopping portion 190 at each end of the sliding grove 110.

At least one stopping portion 190 is movably arranged on the base 100, so that the protruding stopping portion 190 matches at least one position of the corresponding abutting convex portion 210.

The positions of the abutting convex portion 210 of the quick-release plate 200 in different specifications are different, the stopping portion 190 is movably installed on the base 100, and the position of the stopping portion 190 can be changed to match the abutting convex portion of the quick-release plate 200 of different specifications.

In the technical solution of the present application, stopping portions 190 are respectively provided at two ends of the sliding groove 110, and the stopping portion 190 at the at least one end of a sliding groove 110 can move in the base 100, so that the stopping portion 190 protruding from the end of the sliding groove 110 has different positions to adapt to quick-release plates 200 of different specifications. When the stopping portion 190 is protruded at a certain position at the end of the sliding groove 110, a certain specification of the quick-release plate 200 can slide stably in the sliding groove 110, that is, the stopping portion 190 protruding at this position is abutted against the abutting convex portion 210 of the quick-release plate 200 of this specification, and the quick-release plate 200 slides to a limit position in the sliding groove 110. When the stopping portion 190 is switched to protrude at another position at the end of the sliding groove 110, the quick-release plate 200 of another specification can slide stably in the sliding groove 110, that is, the stopping portion 190 at this position abuts against the abutting convex portion 210 of the quick-release plate 200 of this specification, and the quick-release plate 200 slides to the limit position in the sliding groove 190. Similarly, the stopping portion 190 at the other end of the sliding groove 110 can also have different protruding positions. In this way, when switching quick-release plates 200 of different specifications, the user does not need to replace the matching sliding groove 190 on the pan-tilt, and the sliding groove 190 can be adapted to a variety of standard quick-release plates 200 and the position of the abutting convex portion 210 on the back of each quick-release plate 200 is different, which improves the convenience for users to use the quick-release plate assemblies.

The sliding groove 110 is arranged through an upper horizontal surface of the base 100, and an end of the sliding groove 110 is referred to in a direction S of the sliding groove 110 through the base 100. Specifically, the stopping portion 190 is movably provided on the bottom wall of the sliding groove 110, a moving form can be horizontal moving on the bottom wall of the sliding groove 110, that is, only one stopping portion 190 is provided at one end of the sliding groove 110, and the stopping portion 190 can change the position of the convex portion through moving in a straight line or an arc.

In an embodiment, two stopping portions 190 are provided at the limiting position of the quick-release plate 200 sliding in the sliding groove 110. One of the stopping portions 190 is fixed, and the other one of the stopping portions 190 is flexible; or two stopping portions 190 are flexible. In an embodiment, a plurality of stopping portions 190 are provided, one of the plurality of stopping portions 190 arranged on one end of the sliding groove is flexible, and the other stopping portions 190 arranged on the other end of the sliding groove are fixed; or more than two adjustable stopping portions 190 are provided at each end of the sliding groove 110.

The moving form can also be moving in a direction of the bottom wall of the vertical sliding groove 110, that is, the end of the sliding groove 110 is provided with a plurality of stopping portions 190, and the plurality of stopping portion 190 are respectively arranged at different positions of the end, and can be alternately protruded so as to adapt to quick-release plates 200 of various specifications pre-designed. In other embodiments, when the plurality of stopping portions 190 protruding from the end do not interfere with the sliding of the corresponding quick-release plate 200, the plurality of stopping portions 190 in the end can always be protruding In an embodiment, referring to FIG. 8 to FIG. 10, the bottom of the sliding groove 110 is provided with a guiding straight groove 112 extending along a width direction D of the sliding groove 110. The stopping portion 190 includes a first stopping portion 120 passing through the guiding straight groove 112 and moving along an extending direction of the guiding straight groove 112 to match the position of the abutting convex portion 210 of the corresponding quick-release plate 200. It can be understood that the first stopping portion 120 is protrudingly provided at the bottom of the sliding groove 110, and by switching the position of the first stopping portion 120 at the two ends of the guiding straight groove 112, two specifications of quick-release plate 200 can be adapted to the two ends of the guiding straight groove 112. The quick-release plate 200 of a certain specification can also be adapted to the stopping portion 120 switched on the guiding straight groove 112 of a certain specification at other parts besides the two ends of the guiding straight groove 112. It should be noted that the first stopping portion 120 at any position on the guiding straight groove 112 can be fitted with the abutting convex portion 210 on the quick-release plate 200 of different specifications. In this way, it can be ensured that the sliding groove 110 can be adapted to at least two types of quick-release plates 200.

Figure 8:
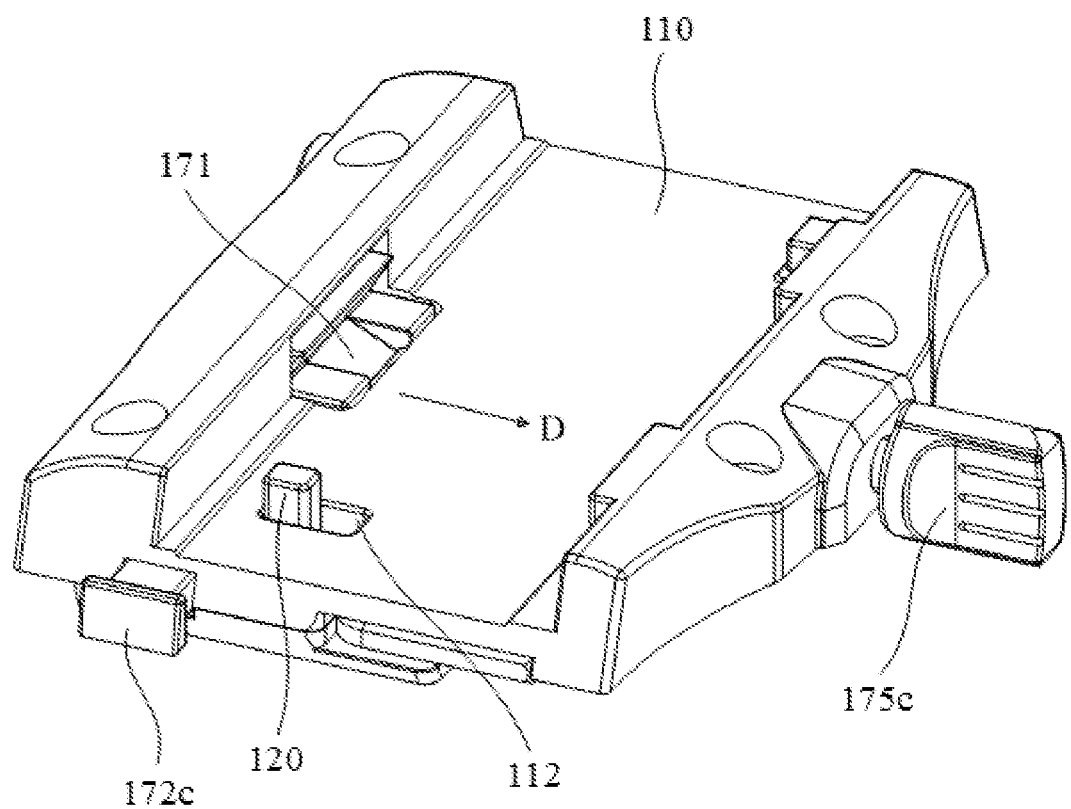
FIG. 8 is a schematic structural view of the base of the quick-release plate assembly according to an embodiment of the present application.
Figure 9:
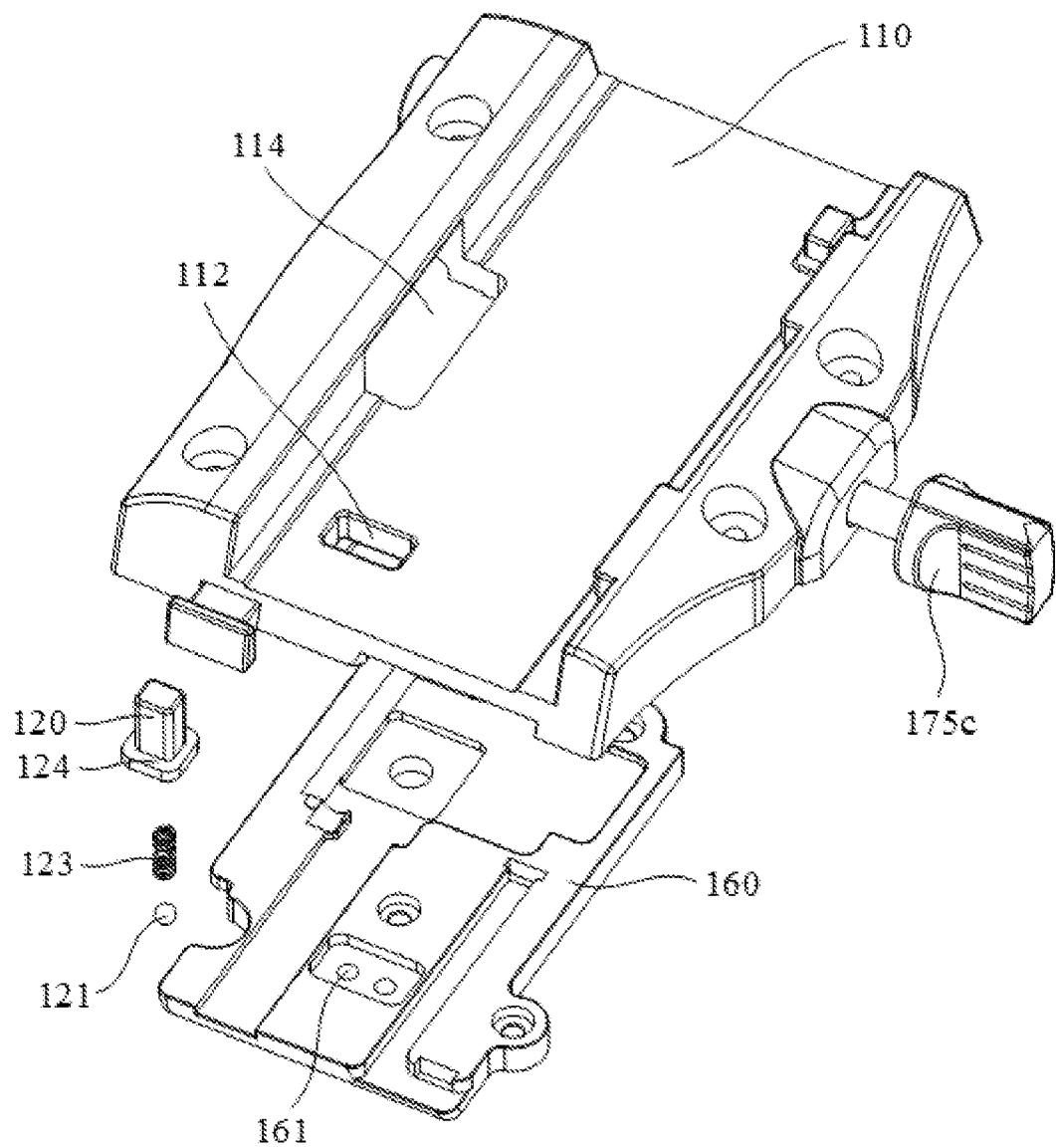
FIG. 9 is an explosion view of the base in FIG. 8.
Figure 10:
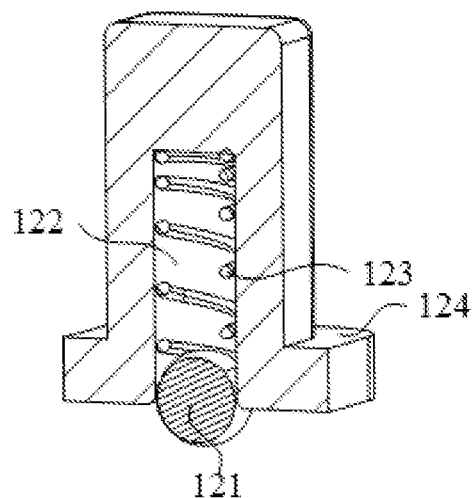
FIG. 10 is a cross-sectional view of a first stopping portion in FIG. 8.

Further, in this embodiment, referring to FIG. 8 to FIG. 10, the quick-release plate assembly further includes a sealing plate 160 arranged on the back side of the base 100, on which the upper side of the base 100 is arranged the sliding groove 110, and an accommodating space is formed between the sealing plate 160 and the base 100. One end of the first stopping portion 120 is limited in the accommodating space, and the other end passes through the guiding straight groove 112 and protrudes from the surface of the sliding groove 110 to stop the abutting convex portion 210 of the quick-release plate 200 of a certain specification. One side of the sealing plate 160 facing the guiding straight groove 112 is provided with a plurality of recesses 161, the plurality of recesses 161 are distributed at intervals along the extending direction D of the guiding straight groove 112, and the bottom of the first stopping portion 120 protrudes a limiting convex portion 121 elastically clamped with one of the recesses 161 selected. It can be understood that when the limiting convex portion 121 is clamped in the recess 161, the first stopping portion 120 can maintain a certain degree of stability, so as to ensure that the first stopping portion 120 can be abutted against the abutting convex portion 210 of the quick-release plate 200. In this way, when it is necessary to switch the first stopping portion 120 to another position to adapt to the quick-release plate 200 of another specification, the first stopping portion 120 can be pushed and slide along the guiding straight groove 112 along the orientation D show in FIG. 8, and the limiting convex portion 121 breaks away from the recess 161 that was originally clamped, and clamp with another recess 161 selected. It should be noted that the shape of the recess 161 is a semicircle or an arc. In an embodiment, referring to FIG. 9, one end of the first stopping portion 120 limited to the accommodating space is provided with a limiting flange 124, the limiting flange 124 is arranged in the accommodating space and abuts against an edge of a back side of the guiding straight groove 112, so as to prevent the first stopping portion 120 from detaching from the guiding straight groove 112.

Specifically, in this embodiment, referring to FIG. 8 to FIG. 10, an opening cavity 122 is provided on one side of the first stopping portion 120 facing the recess 161, and a first elastic member 123 is provided in the opening cavity 122. The limiting convex portion 121 is movably provided on the opening of the opening cavity 122, and two ends of the first elastic member 123 are elastically abutted against the bottom of the opening cavity 122 and the limiting convex portion 121 respectively. In this embodiment, the limiting convex portion 121 is arranged as a sphere. The limiting convex portion 121 can move up and down at the opening of the opening cavity 122 without detaching from the opening cavity 122, and will not sink into the opening cavity 122 under the elastic force of the first elastic member 123, so that it cannot be clamped with the recess 161. In this way, the first stopping portion 120 is at the certain position, and the stopping portion convex portion 121 is elastically clamped with the corresponding position under the action of the first elastic member 12 in the recess 161. When the first stopping portion 120 needs to be switched to another position, the first stopping portion 120 can slide along the guiding straight groove 112, and the limiting convex portion 121 is detached from the clamped recess 161 and is partially retracted into the opening cavity 122 under the action of the side wall between the clamped recess 161 on the sealing plate. When the limiting convex portion 121 slides to the next recess 161, the limiting convex portion 121 is re-clamped with the recess 161 under the action of the first elastic member 123, so as to ensure the stability of the abutting between the first stopping portion 120 and the abutting convex portion 210 at this position. Specifically, in this embodiment, the first elastic member 123 is a spring, and the spring is in a compressed state.

Figure 11:
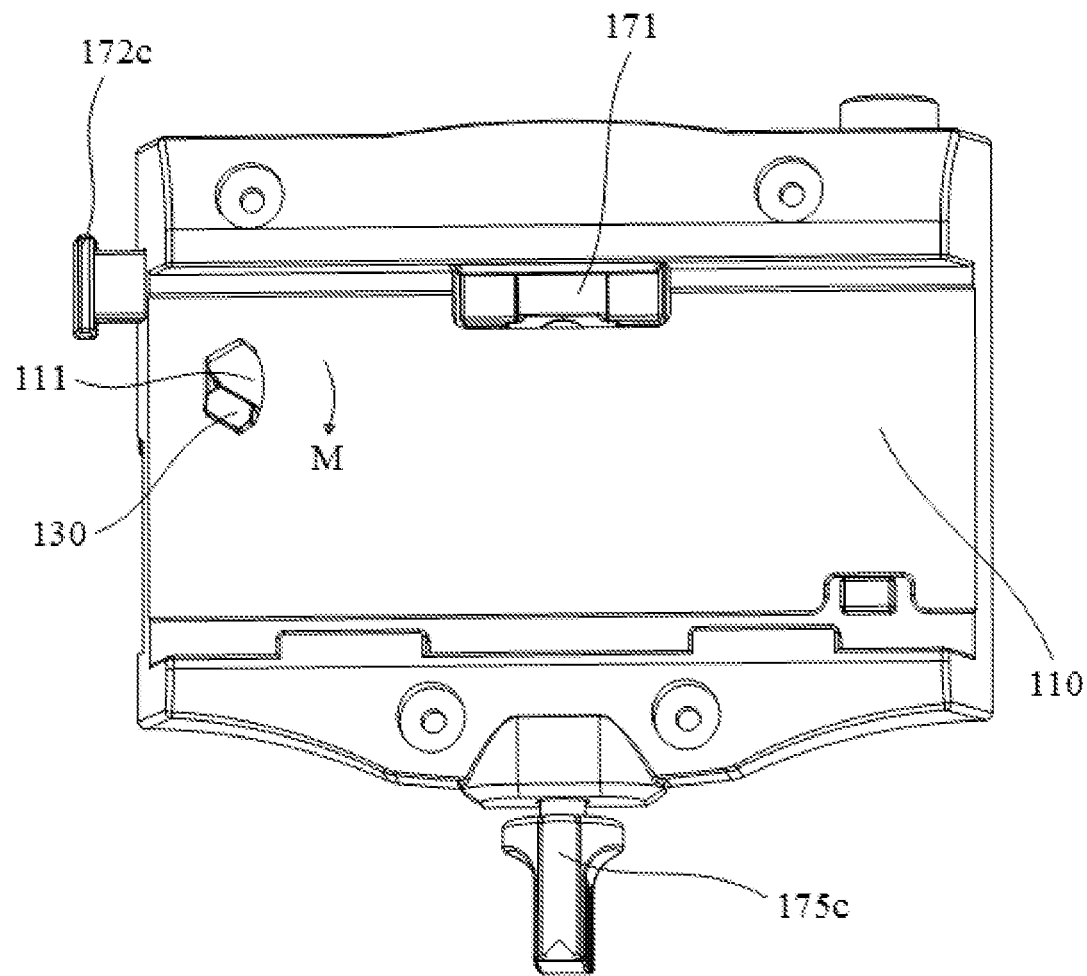
FIG. 11 is a schematic structural view of the base of the quick-release plate assembly according to an embodiment of the present application.
Figure 12:
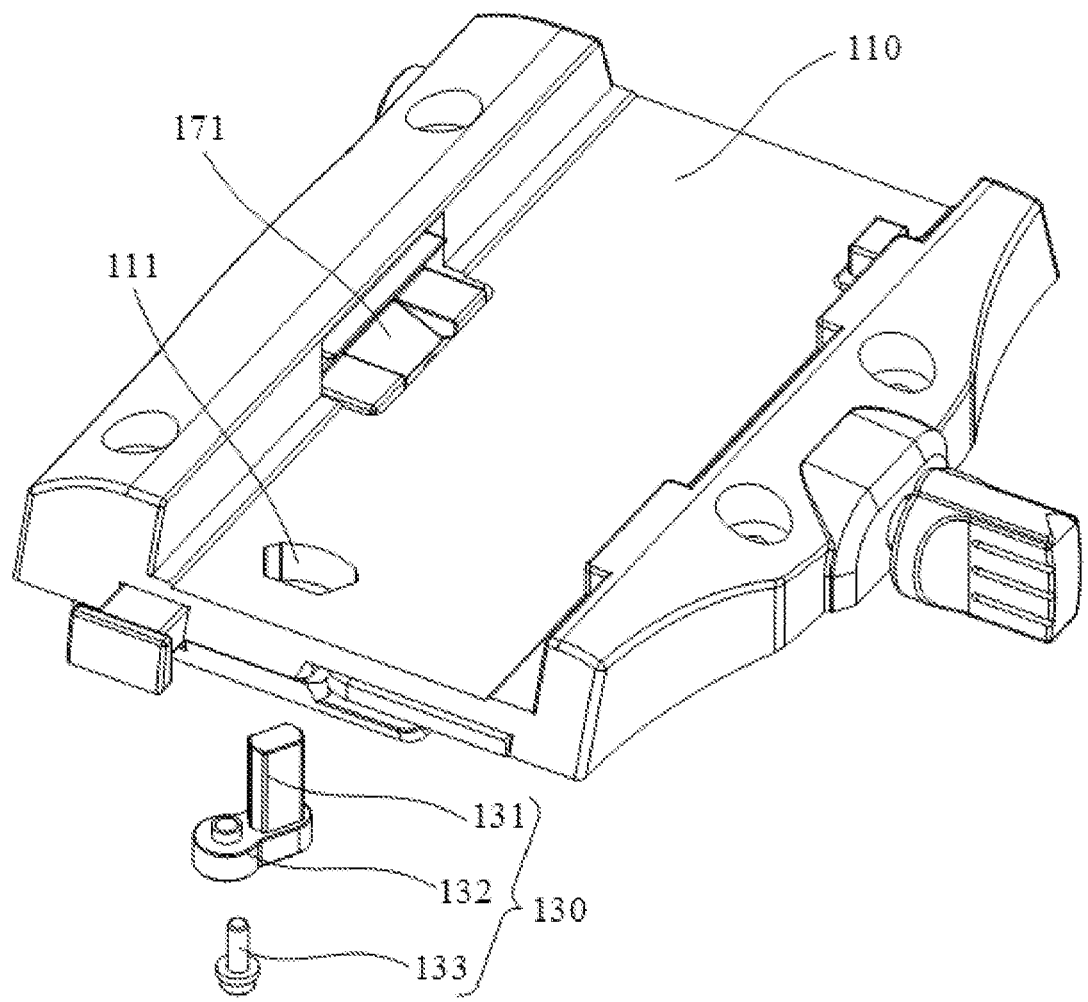
FIG. 12 is an explosion view of the base in FIG. 11.

In an embodiment, referring to FIG. 11 and FIG. 12, the bottom of the sliding groove 110 is provided with a scallop hole 111, and the stopping portions 190 includes a second stopping portion 130 rotatably provided in the scallop hole 111. The center of the scallop hole 111 is arranged on a rotating axis of the second stopping portion 130. When abutted against two side edges of the scallop hole 111, the second stopping portion 130 can abut against the abutting convex portion 210 of the quick-release plates 200 of two specifications. It should be noted that the scallop hole 111 is extended in an arc along the direction M, and the direction M is roughly parallel to the width direction D of the sliding groove 110. It can be understood that when the second stopping portion 130 is at the two side edges of the scallop hole 111, the force of the second stopping portion 130 and the side edge of the scallop hole 111 can ensure the stability of the second stopping portion 130 abutting against the abutting convex portion 210. In this way, the second stopping portion 130 changes the protruding position through moving in the arc, so as to adapt to the quick-release plate 200 of different specifications, which improves the convenience for the user to use the quick-release plate assembly.

Further, in this embodiment, referring to FIG. 11 and FIG. 12, the base 100 is provided with a first rotating shaft 133 adjacent to or coincide with the center of the scallop hole 111. The second stopping portion 130 includes a main body portion 131 and a rotating portion 132 connected to the main body portion 131. The rotating portion 132 is rotatably connected to the first rotating shaft 133 on the side of the base 100 back away from the sliding groove 110, and the main body portion 131 is passing through the scallop hole 111 and protrudes out of the sliding groove 110 to stop the abutting convex portion 210 of the quick-release plate 200 of a certain specification. In this embodiment, a bearing is provided between the rotating portion 132 and the first rotating shaft 133, and a limiting flange is provided on an axial direction of the first rotating shaft 133, so that the rotating portion 132 can rotate stably around the first rotating shaft 133. In this way, it only takes to rotate the main body portion 131 around the first rotating shaft 133, and the protruding position of the second stopping portion 130 can be switched substantially in the direction M, so as to adapt to the quick-release plate 200 of different specifications. In other embodiments, the first rotating shaft 133 is independently installed in the base 100, and the two ends of the first rotating shaft 133 are respectively connected to the upper and lower sides of the base 100 There is a certain gap between the middle part of the first rotating shaft 133 and the base 100, and the rotating portion 132 is arranged in the scallop hole 111. The inner rotating is connected to the first rotating shaft 133.

In an embodiment, referring to FIG. 13 to FIG. 16A, the bottom of the sliding groove 110 is provided with a plurality of avoiding holes 113 distributed at intervals along the width direction D of the sliding groove 110. The stopping portion 190 includes a plurality of third stopping portions 140, and only one third stopping portion 140 is telescopically arranged in an avoiding hole 113 correspondingly, so each avoiding hole 113 accommodate one third stopping portion 140, and at least one third stopping portion 140 being selected protrudes out of the surface of the avoiding hole 113 to be fitted with the corresponding abutting convex portion 210. In this way, when one of the plurality of third stopping portions 140 protrudes from the sliding groove 110, the rest of the third stopping portions 140 can be accommodated in the corresponding avoiding holes 113, so as to adapt to the quick-release plate 200 of the specification. In other embodiment, when the quick-release plates 200 of different specifications slide in the sliding groove 110 without interfering with the plurality of third stopping portions 140, the plurality of third stopping portions 140 can be protrudingly arranged in the sliding groove 110. It should be noted that the plurality of avoiding holes 113 are arranged at intervals in the width direction of the sliding groove 110, and it is not limited whether the interval is in the length direction of the sliding groove 110.

Further, in this embodiment, the quick-release plate assembly further includes a sealing plate 160 arranged on one side of the base 100 back away from the sliding groove 110, and an accommodating space is formed between the sealing plate 160 and the base 100. Referring to FIG. 13 to FIG. 16A, the third stopping portion 140 is slidably connected to the sealing plate 160 and/or the base 100, and a second elastic member 154 is provided between the third stopping portion 140 and the sealing plate 160. Two ends of the second elastic member 154 are elastically abutted against the sealing plate 160 and the third stopping portion 140 respectively, so that the third stopping portion 140 can extend and retract in the avoiding hole 113. In this embodiment, the third stopping portion 140 is provided with a locking structure with the base 100 or the sealing plate 160 in the accommodating space. When the third stopping portion 140 is pressed to overcome the elastic force of the second elastic member 154 and retract in the avoiding hole 113, the third stopping portion 140 is stably locked in the accommodation space and compresses the second elastic member 154. A limiting step 143 is provided on an outer peripheral side in the direction from the sealing plate 160 to the second elastic member 154. When the second elastic member 154 pushes the third stopping portion 140 until one end of the third stopping portion 140 protrudes from the surface of the sliding groove 110, the limiting step 143 is abutted against the edge of the back of the base 100, so to prevent the third stopping portion 140 from detaching from the avoiding hole 113. In this way, the elastic force of the second elastic member 154 can ensure that the third stopping portion 140 can extend and retract stably in the avoiding hole 113, which improves the user's operation convenience. It should be noted that, in this embodiment, the second elastic member 154 is a spring and is in a compressed state, and the back of the base 100 is away from the sliding groove 110.

Figure 16A:
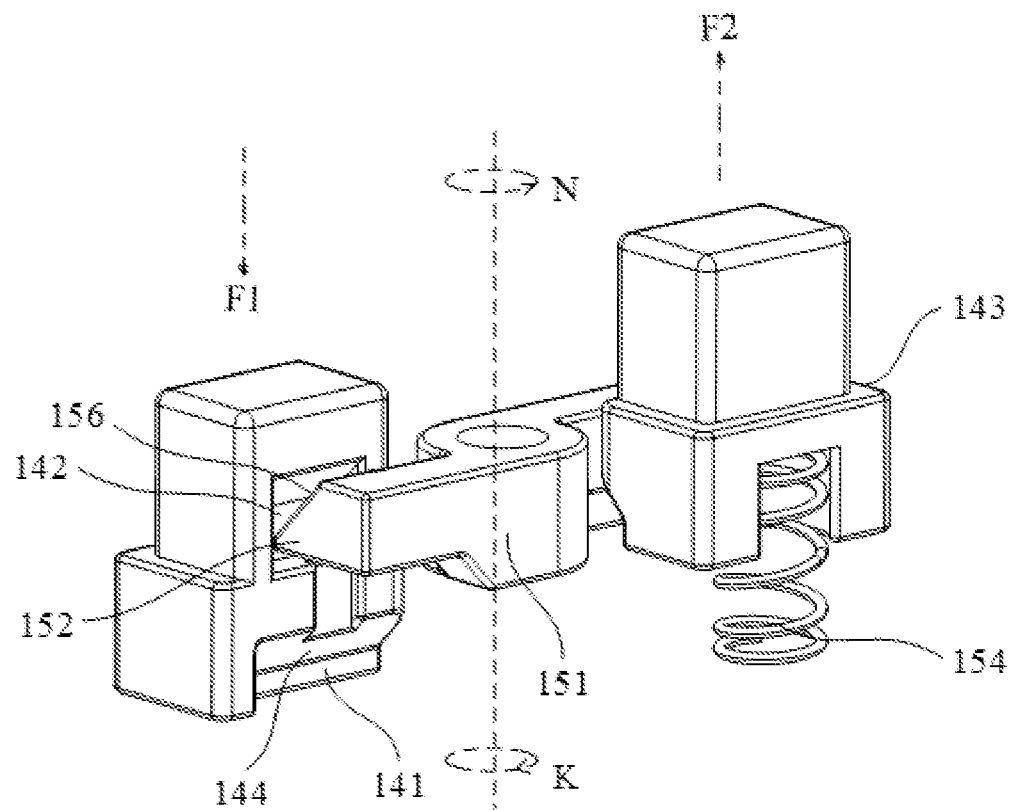
FIG. 16A is a structural schematic view of a rotating rod and a third stopping portion in FIG. 13.

Specifically, in this embodiment, referring to FIG. 13 to FIG. 16A, the quick-release plate assembly further includes a rotating rod 151. A second rotating shaft 153 is provided between the sealing plate 160 and the base 100, and a middle part of the rotating rod 151 is rotatably connected to the second rotating shaft 153. Two third stopping portions 140 are respectively arranged at two ends of the rotating rod 151, and are respectively arranged on the opposite side of the rotating rod 151 in the rotational circumferential direction of the rotating rod 151. As shown in FIG. 16A, when the rotating rod 151 rotates around the second rotating shaft 153 along the direction K, the two ends of the rotating rod 151 can simultaneously touch the two third stopping portions 140 at two ends of the rotating rod 151. Each of the third stopping portion 140 is provided with a first slot 141 and a second slot 142 distributed in the direction from the sealing plate 160 to the base 100, in this embodiment, two third stopping portions 140 locate on opposite of each end of the rotating rod 151 respectively. As shown in FIG. 16A and FIG. 16B, each end of the rotating rod 151 is protrudingly provided with a clamping convex portion 152 facing the third stopping portion 140 in the rotating direction of the rotating rod 151.

A third elastic member 155 is abutted between the side of the rotating rod 151 back away from the clamping convex portion 152 and/or the sealing plate 160. When the clamping convex portion 152 of the rotating rod 151 is clamped in the first slot 141 of the third stopping portion 140 located near on one end of the rotating rod 151, the other clamping convex portion 152 located on the other opposite end of the rotating rod 151 is correspondingly clamped in another second slot 142 of the another third stopping portion 140 located near on the other opposite end of the rotating rod 151, as shown in FIG. 16B.

Figure 13:
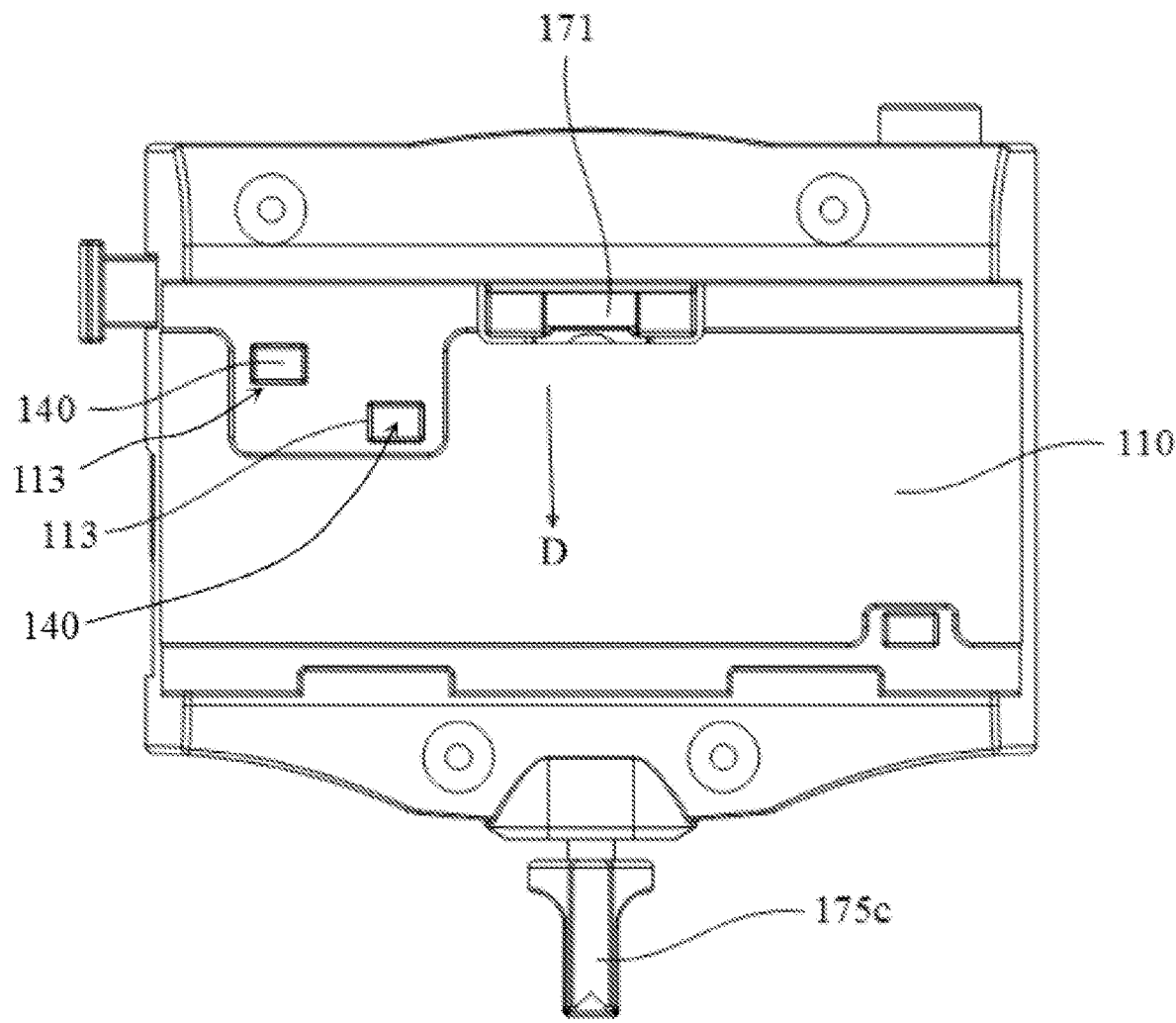
FIG. 13 is a schematic structural view of the base of the quick-release plate assembly according to an embodiment of the present application.
Figure 14:
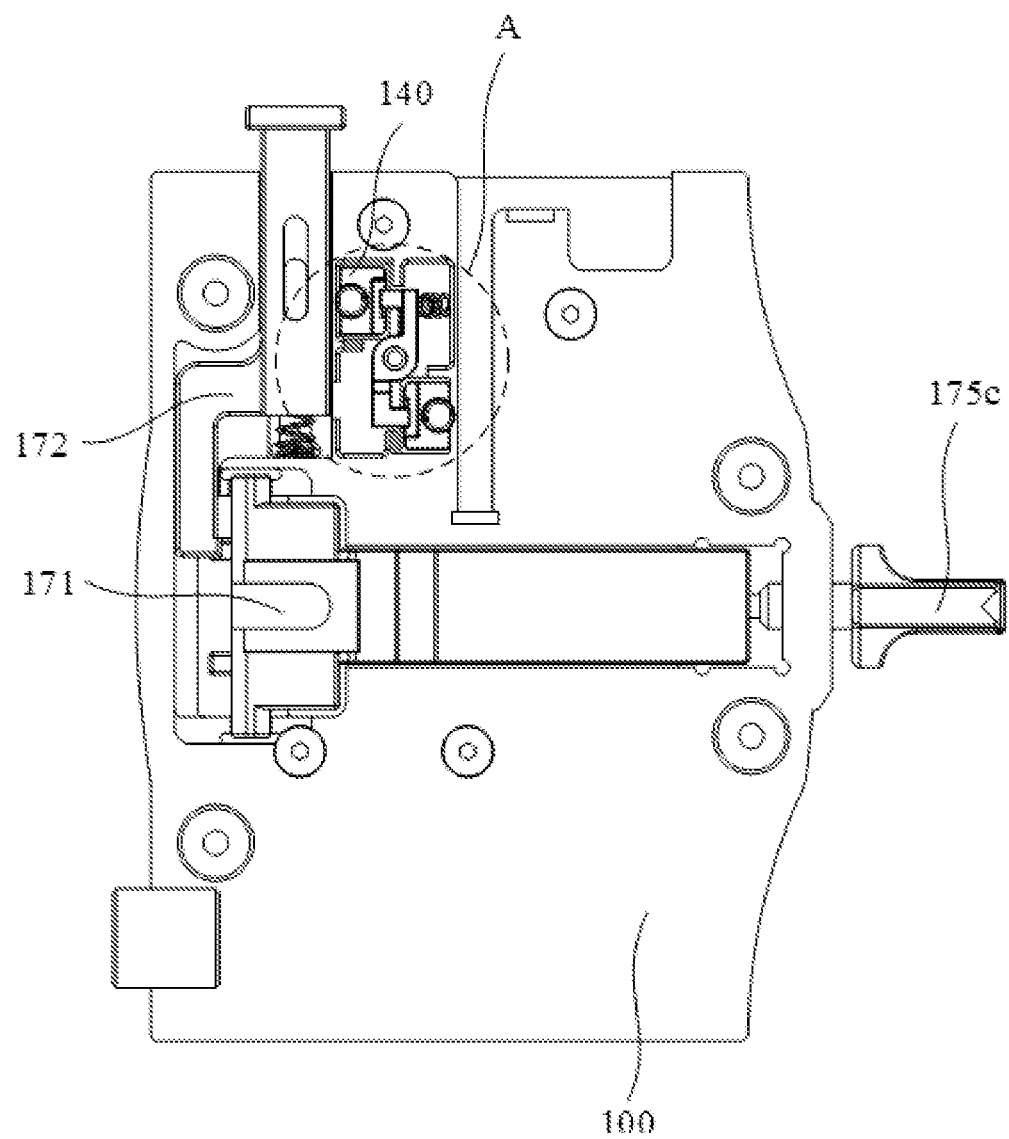
FIG. 14 is a schematic structural view of a back side of the base without the sealing plate in FIG. 13.
Figure 15:
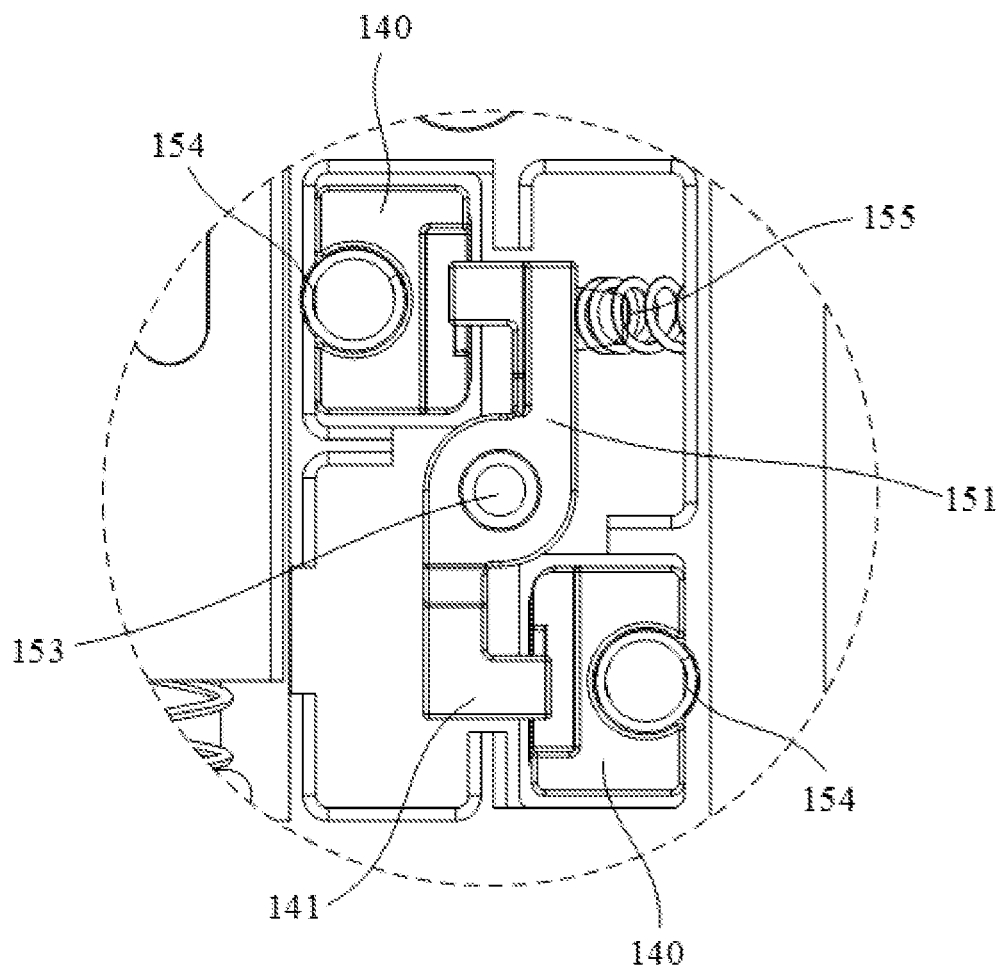
FIG. 15 is a partial enlarged view at A in FIG. 14.
Figure 16B:
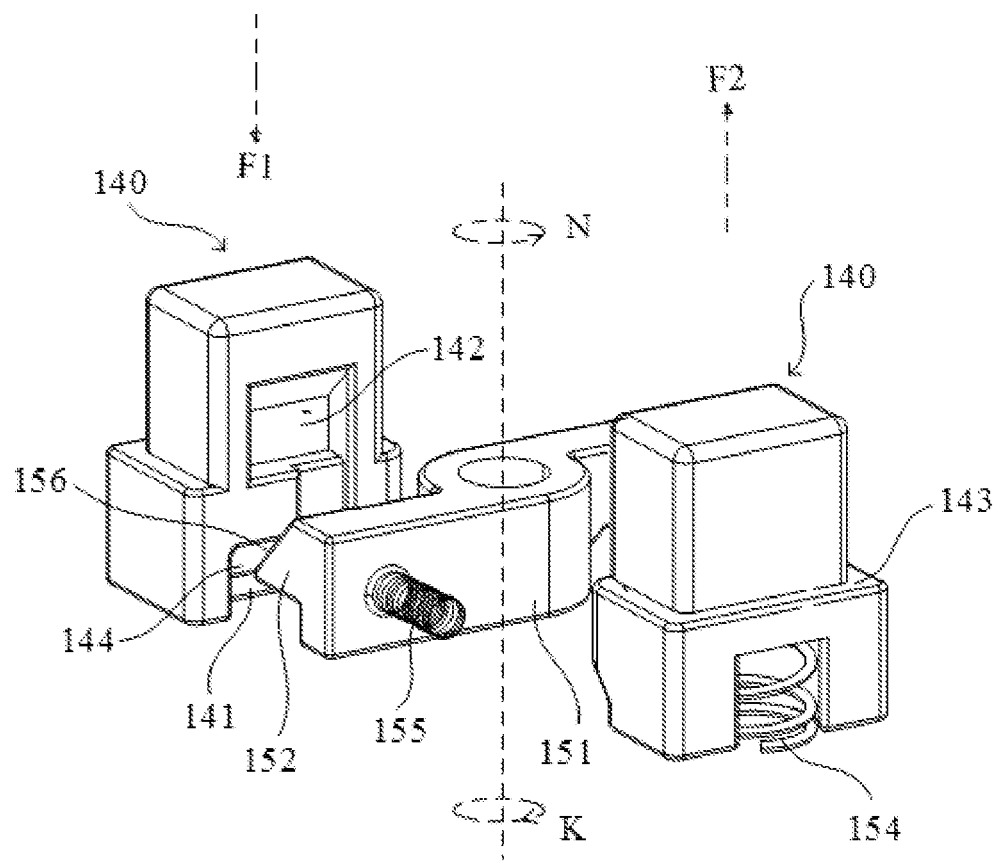
FIG. 16B is a schematic structural view of the rotating rod and the third stopping portion in another state in FIG. 16A.

Referring to FIG. 13 to FIG. 16B, two extending arms of the rotating rod 151 centered on the second rotating shaft 153 are symmetrically arranged, and the two third stopping portions 140 are respectively arranged in the two avoiding holes 113 and distributed in the width direction D of the sliding groove 110. Under normal conditions, as shown in FIG. 16B and FIG. 13, one third stopping portion 140 protrudes from one avoiding hole 113, and at the same time, another third stopping portion 140 is retracted and recessed into another one avoiding hole 113. When it needs to be switched, press the protruding third stopping portion 140, and the pressed third stopping portion 140 retracts into the avoiding hole 113, while the other one third stopping portion 140 protrudes out of the avoiding hole 113 due to linkage, as shown in FIG. 16. In this way, the third stopping portion 140 protruding from the avoiding hole 113 can be selected and switched by pressing, so as to change the protruding position of the stopping portion in the sliding groove 110 to adapt to the abutting convex portion 210 on the back of the quick-release plate 200 of different specifications. The working principles of the two third stopping portions 140 are as follows:

In the process of switching the state shown in FIG. 16B to the state shown in FIG. 16A, as shown in FIG. 16B, the third stopping portion 140 protruding from the sliding groove 110 is pressed. During the process of the stopping portion 140 moving in the direction F1 and retracting in the corresponding avoiding hole 113 under the downward force, a first guiding slope 156 of the corresponding clamping convex portion 152 is abutted against a second guiding slope 144 contacted with the corresponding first slot 141, and the clamping convex portion 152 is pushed out of the first slot 141 along the direction N. The rotating rod 151 overcomes the elastic force of the third elastic member 155 and rotates along the direction N, that is, the first slot 141 on the third stopping portion 140 is detached from the corresponding clamping convex portion 152. At the same time, when rotating around the direction N, the rotating rod 151 directly drives the other clamping convex portion 152 located on the other end of the rotating rod 151 to detach from the second slot 142 of another third clamping convex portion 152. In this way, under the action of the downward force, the pressed third stopping portion 140 moves along the direction F1, and the other third stopping portion 140 moves along the direction F2 under the elastic force of the second elastic member 154 until the second slot 142 on the pressed third stopping portion 140 is moved to the position facing the corresponding clamping convex portion 152. The third elastic member 155 pushes, around the direction K, the clamping convex portion 152 into the second slot 142, where the pressed third stopping portion 140 compresses the corresponding second elastic member 154. In this process, because of the linkage, another third stopping portion 140 slides in the direction F2 under the action of the corresponding second elastic member 154, as shown in FIG. 16A. When the another third stopping portion 140 rises to protrude from the sliding groove 110 to stop the abutting convex portion 210 of a certain quick-release plate 200, the first slot 141 of the another third stopping portion 140 is facing to the corresponding clamping convex portion 152. Under the elastic action of the third elastic member 155, the rotating rod 151 is pushed to rotate around the direction K, thereby driving the clamping convex portion 152 to be inserted into the corresponding first slot 141 on the other third stopping portion 140. In this linkage way, when one third stopping portion 140 protrudes from the sliding groove 110, the other third stopping portion 140 retracts in the avoiding hole 113, and will not be interfered by other third stopping portions when the quick-release plate 200 of different specifications is switched.

It should be noted that, referring to FIG. 16A and FIG. 16B, when the rotating rod 151 rotates around the direction K, the clamping convex portion 152 is clamped into the first slot 141 or the second slot 142, and when the rotating rod 151 rotates in the direction N, the clamping convex portion 152 detaches from the first slot 141 or the second slot 142.

In an embodiment, referring to FIG. 1 to FIG. 7, the quick-release plate assembly further includes a sealing plate 160 arranged on the back of the sliding groove 110 of the base 100. The base 100 is provided with a clamping structure 170, and an accommodating groove 180 is formed between the base 100 and the sealing plate 160. The wall of the sliding groove 110 is provided with a communicating port 114, and the sliding groove 110 is communicated with the accommodating groove 180 through the communicating port 114. The clamping structure 170 is arranged in the accommodating groove 180 and can pass through the communicating port 114 to limit the quick-release plate 200. In this way, when the quick-release plate 200 is mounted on the sliding groove 110, the clamping structure 170 limits the quick-release plate 200 in the sliding groove 110 through the communicating port 114, where the quick-release plate 200 can slide along the extending direction of the sliding groove 110. It is convenient to drive the photographic equipment to slide in the sliding groove 110 to adjust the shooting direction or position of the photographic equipment. The stopping portion 190 of the quick-release plate 200 is cooperated with the abutting convex portion 210 at the back of the quick-release plate 200 to limit the sliding route of the photographic equipment in the sliding groove 110 driven by the quick-release plate 200, so as to prevent the quick-release plate 200 from sliding to the two ends of the sliding groove 110 and fall. Further, when the quick-release plate 110 drives the photographic equipment to slide in the sliding groove 110 to reach the ideal position, the clamping structure 170 can press and fix the quick-release plate 200 in a certain position in the sliding groove 110, so that the quick-release plate 200 and the sliding groove 110 are relatively stable, which avoids the quick-release plate 200 from sliding relative to the sliding groove 110 and ensures the stability of the operation of the photographic equipment.

Figure 17:
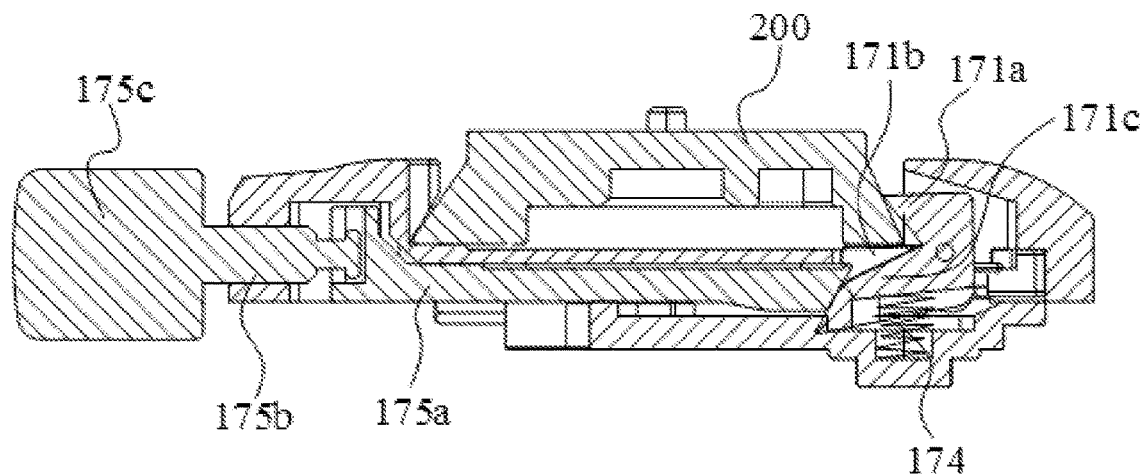
FIG. 17-FIG. 19 are schematic cross-sectional views of installing the quick-release plate from the sidewall of the sliding groove into the base in FIG. 1.
Figure 18:
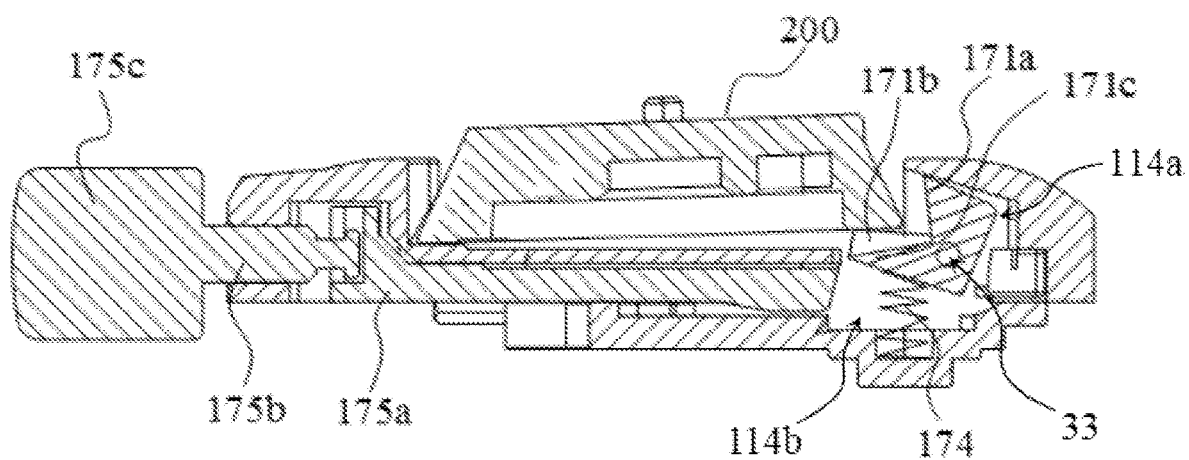
Figure 19:
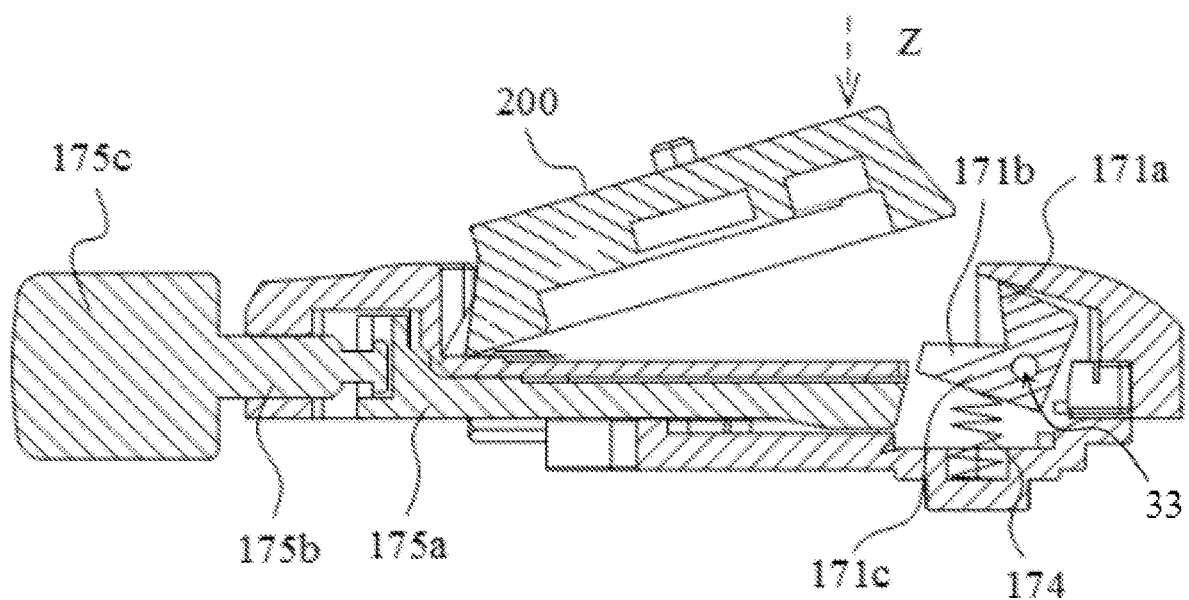

Further, in this embodiment, referring to FIG. 1 to FIG. 19, the communicating port 114 is provided with a first portion 114a on the side wall of the sliding groove 110 and a second portion 114b on the bottom wall of the sliding groove 110. The clamping structure 170 includes a limiting member 171 arranged at the communicating port 114. The limiting member 171 is provided with a first abutting portion 171a accommodated in the first portion 114a and a second abutting portion 171b corresponding accommodated in the second portion 114b, an included angle is formed between the first abutting portion 171a and the second abutting portion 171b, and the limiting member 171 is rotatably connected to the wall of the accommodating groove 180, so to have a first state and a second state. As shown in FIG. 17 to FIG. 19, in the first state, the first abutting portion 171a protrudes from the side wall of the sliding groove 110, and abuts against the side wall of the quick-release plate 200, so that the quick-release plate 200 is pressed against the bottom wall of the sliding groove 110. At the same time, the second abutting portion 171b is accommodated in the second portion 114b. In the second state, the first abutting portion 171a is retracted and accommodated in the first portion 114a, the quick-release plate 200 can be detached from the sliding groove 110 through the notch of the sliding groove 110. The second abutting portion 171b protrudes from the sliding groove 110 to lift the quick-release plate 200 installed in the sliding groove 110 for easy disassembly, as shown in FIG. 18. It can be understood that when the limiting member 171 is in the second state, the second abutting portion 171b protrudes from the bottom wall of the sliding groove 110, and the first abutting portion 171a is accommodated in the first portion 114a. As shown in FIG. 19, if it is necessary to install the quick-release plate 200 in the sliding groove 110, first insert one edge of the quick-release plate 200 into the side of the sliding groove 110 opposite to the clamping structure 170, then press down the other side of the quick-release plate 200 along the direction Z. The back side of the other side of the quick-release plate 200 presses down on the protruding second abutting portion 171b, and the second abutting portion 171b receives the pressing force and rotates around the rotating axis 33 and retracts in the second part 114b. At the same time, the abutting portion 171a protrudes out of the first portion 114a by synchronous rotating around the rotating axis 33, and presses against the side wall of the quick-release plate 200 to limit the quick-release plate 200 in the sliding groove 110. At this time, the limiting member 171 is in the first state. As shown in FIG. 17, the quick installation of the quick-release plate 200 is completed at this time. If the quick-release plate 200 needs to be taken out from the sliding groove 110, the limiting member 171 needs to be manually switched from the first state to the second state, the quick-release plate 200 is no longer limited by the limiting member 171 and can be taken out.

Figure 5:
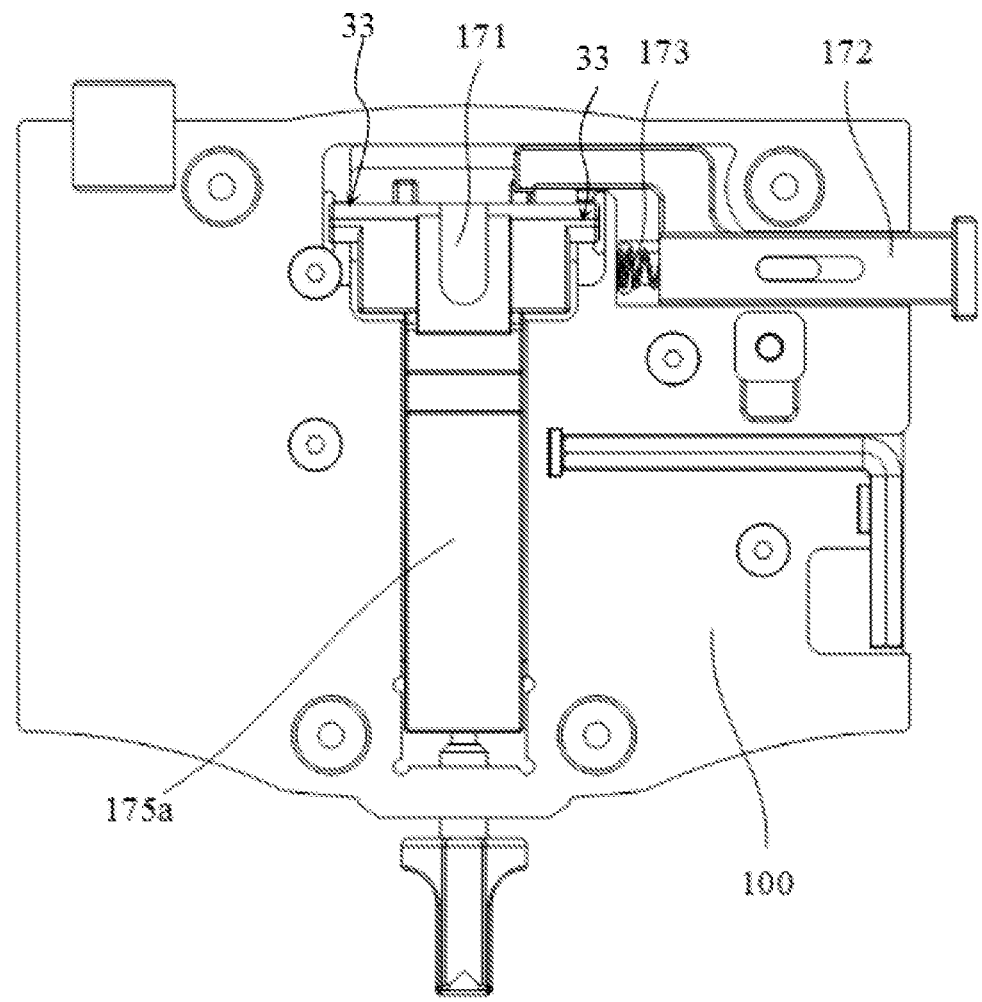
FIG. 5 is a schematic view of a back side of the base without a sealing plate in FIG. 1.
Figure 6:
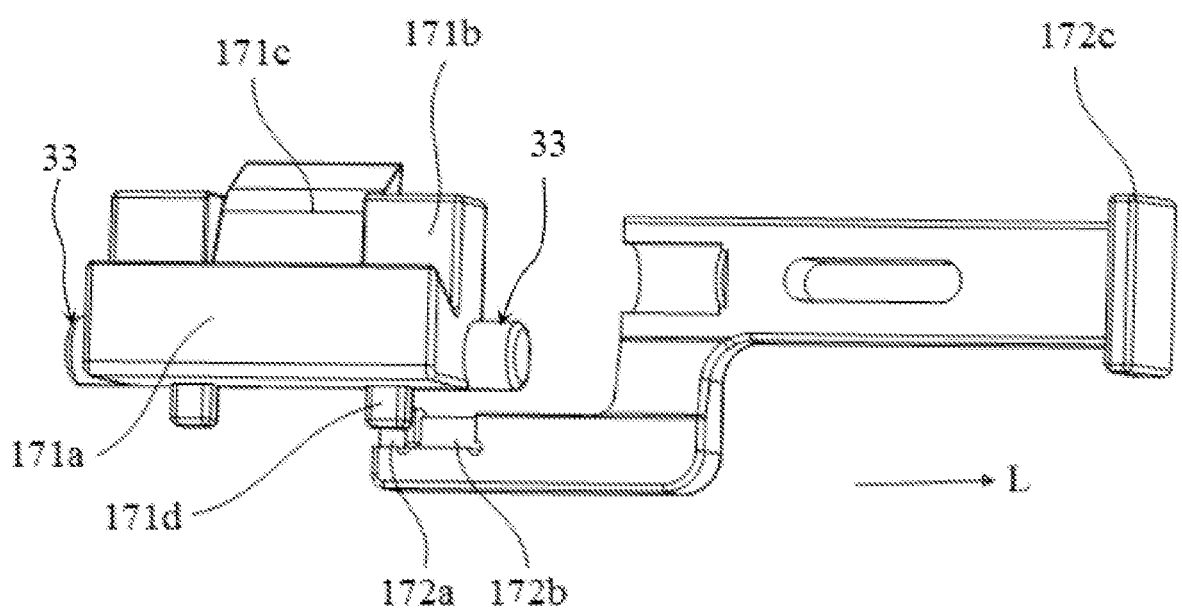
FIG. 6 is a schematic structural view of a cooperation between the pushing rod and the stopping portion in FIG. 1.
Figure 7:
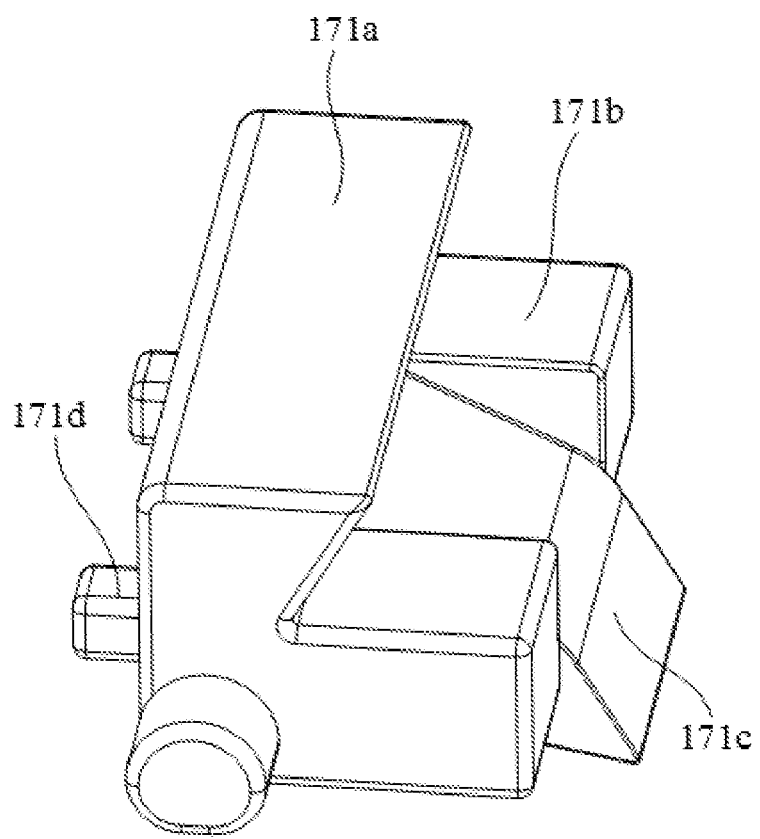
FIG. 7 is a schematic structural view of the limiting member in FIG. 1.

Specifically, in this embodiment, referring to FIG. 1 to FIG. 19, the clamping structure 170 further includes a pushing rod 172, a first resetting spring 173 and a second resetting spring 174. One end of the pushing rod 172 extends into the accommodating groove 180, and can move in the accommodation groove 180. The two ends of the first resetting spring 173 elastically abut against the pushing rod 172 and the wall of the accommodation groove 180 respectively, and the elastic expansion and retraction direction of the first resetting spring 173 is parallel to moving in the direction L of the pushing rod 172. As shown in FIG. 17, two ends of the second resetting spring 174 elastically abut against the back side of the second abutting portion 171b and the opposite side of the sealing plate 160 respectively. As shown in FIG. 6, one side of the limiting member 171 facing to the pushing rod 172 is provided with a first clamping portion 171d, the pushing rod 172 is provided with a second clamping portion 172a and a third slot 172b in sequence in the moving direction L, and the second clamping portion 172a is used for abutting against the first clamping portion 171d. The third slot 172b is used to accommodate the first clamping portion 171d and allow the first clamping portion 171d to move inside it. Pressing the end of the pushing rod 172 opposite the direction L and moving the pushing rod 172 in the accommodating groove 180 can switch the position of the first clamping portion 171d between the second clamping portion 172a and the third slot 172b. It should be noted that, under the action of the first resetting spring 173, As shown in FIG. 5 and FIG. 6, when pushing the pushing rod 172 on the opposite of the direction L to make it moving, until the first clamping portion 171d is facing the third slot 172b, then clamped with the third slot 172b, the first clamping portion 171d has a tendency to move toward the second clamping portion 172a. The back surface of first clamping portion 171d abuts against the upper surface of the second clamping portion 172a, as shown in FIG. 6, the limiting member 171 is limited in the first state, and when the first clamping portion 171d is switched from the second clamping portion 172a to the third slot 172b, the limiting member 171 can be switched from the first state to the second state under the action of the second resetting spring 174.

In an embodiment, referring to FIG. 6, a button 172c is provided at the end of the pushing rod 172 outside the accommodating groove 180. The first clamping portion 171d and the second abutting portion 171b are respectively arranged at two opposite sides of a rotating shaft 33 of the limiting member 171. When the button 172c is manually pressed, the pushing rod 172 compresses the first resetting spring 173 and moves toward the accommodating groove 180 in the opposite direction of L, the first clamping portion 171d is no longer abutted against the second clamping portion 172a, and the first clamping portion 171d is clamped in the third slot 172b. The second resetting spring 174 pushes against the second abutting portion 171b to make the limiting member 171 rotate around the rotating shaft 33 until the second abutting portion 171b protrudes in the sliding groove 110 and force to lift up an edge of the quick-release plate 200 in the sliding groove 110. As shown in the FIG. 18, the first abutting portion 171a rotates synchronously and retracts to the first portion 114a. At this time, the limiting member 171 is in the second state, and the quick-release plate 200 mounted on the sliding groove can be quickly detached from the sliding groove, then freely installed another different quick-release plate in the sliding groove 110 again. As shown in FIG. 18 and FIG. 19, when the other quick-release plate 200 is pressed into the sliding groove 110, the quick-release plate 200 pushes the second abutting portion 171b to rotate around the rotating axis 33 and sink into the second part 114b, and compresses the second resetting spring 174. The first abutting portion 171a synchronously rotate to protrude out of the first portion 114a, and the first clamping portion 171d is detached from the third slot 172b. Under the action of the first resetting spring 173, the pushing rod 172 moves outward, the moving direction is L, as shown in FIG. 6, thereby driving the second clamping portion 172a to detach from the third slot 172b and touches the back side of the first clamping portion 171d, and resisting the first clamping portion 171d. At the same time, the limiting member 171 continues to rotate until the first abutting portion 171a protrudes and presses the side edge of the quick-release plate 200, thereby limiting the quick-release plate 200 in the sliding groove 110, as shown in FIG. 17. At this time, the limiting member 171 is in the first state.

In an embodiment, referring to FIG. 1 to FIG. 19, the clamping structure 170 further includes a locking member 175. The side of the second abutting portion 171b facing the communicating port 114 is provided with a limiting slope 171c. One side of the locking member 175 protrudes from the edge of the base 100 and can move in the accommodation groove 180, and the other end of the locking member 175 can move closer to press the limiting slope 171c, so as to press the first abutting portion 171a tightly on the quick-release plate 200. In an embodiment, the locking member 175 and the second abutting portion 171b are arranged on a same side of the rotating axis of the limiting member 171. When the limiting member 171 is in the first state, an external force is acted on one end of the locking member 175 extending to the base 100, so that the other end of the locking member 175 presses against the limiting slope 171c. Under the pressing action of the locking member 175, the second abutting portion 171b rotates away from the communicating port 114 and continues to compress the second resetting spring 174. The first abutting portion 171a rotates synchronously towards the quick-release plate 200, and tightly press against the side wall of the quick-release plate 200, so that the quick-release plate 200 is tightly pressed into the sliding groove 110, thereby avoiding quick-release plate 200 continues to slide in the sliding groove 110 to ensure the stability of photography. In other embodiments, the locking member 175 and the second abutting portion 171b are respectively arranged on opposite sides of the rotating axis of the limiting member 171.

Further, in this embodiment, referring to FIG. 1 to FIG. 7, the locking member 175 includes a top plate 175a slidably connected to the base 100 and a screw 175b screwed to the side of the base 100. One end of the screw 175b is connected with a knob 175c, and the other end of the screw 175b is used for abutting against the top plate 175a when the limiting member 171 is in the first state, so that the top plate 175a presses against the limiting slope 171c. It can be understood that when the external force acts on the knob 175c to drive the screw 175b to rotate in the accommodating groove 180, the screw 175b pushes against the top plate 175a and moves toward the limiting slope 171c until the top plate 175a fully presses the limiting slope 171c, so that the first abutting portion 171a tightly presses against the side edge of the quick-release plate 200, and the quick-release plate 200 is pressed into the sliding groove 110. In an embodiment, the end of the screw 175b away from the knob 175c is movably connected to the end of the top plate 175a away from the limiting slope 171c. When rotated, the screw 175b can synchronously drive the top plate 175a to reciprocate and slide to compress the limiting slope 171c or loose the limiting slope 171c, which improves the operation convenience for the user to lock the limiting member 171.

The present application also provides a tripod, which includes a tripod body and a quick-release plate assembly. The specific structure of the quick-release plate assembly refers to the above-mentioned embodiments. Since this tripod adopts all the technical solutions of all the above-mentioned embodiments, it has at least the above-mentioned beneficial effects brought by the technical solutions of the embodiments, which will not be repeated here. The pan-tilt is installed on the top of the tripod body to ensure the stability of the pan-tilt.

The above descriptions are only embodiments of the present application, and are not intended to limit the scope of the present application. Under the inventive concept of the present application, any equivalent structural transformations made by using the contents of the description and drawings of the present application, or direct/indirect applications in other related technical fields are included in the scope of the present application.

What is claimed is:

1. A quick-release plate assembly applied to a pan-tilt, comprising:
   a base provided with a sliding groove and a plurality of stopping portions, wherein the sliding groove is penetrating through the base, each end of the sliding groove is provided with a protruding stopping portion; and
   a quick-release plate slidably arranged in the sliding groove, wherein one side of the quick-release plate facing to the sliding groove is provided with an abutting convex portion corresponding to two ends of the sliding groove, the quick-release plate is configured to slide back and forth along the sliding groove, and the abutting convex portion is configured to abut against the protruding stopping portion,
   wherein at least one stopping portion is movably arranged on the base, to make the protruding stopping portion match a position of a corresponding abutting convex portion.

2. The quick-release plate assembly of claim 1, wherein a bottom of the sliding groove is provided with a guiding straight groove extending along a width direction of the sliding groove, the stopping portion comprises a first stopping portion passing through the guiding straight groove and is configured to move along the extending direction of the guiding straight groove, to match the position of the corresponding abutting convex portion.

3. The quick-release plate assembly of claim 2, further comprising:
   a sealing plate arranged on a side of the base back away from the sliding groove,
   wherein an accommodating space is formed between the sealing plate and the base, one end of the first stopping portion is limited in the accommodating space, and the other end of the first stopping portion passes through the guiding straight groove and protrudes from the sliding groove; and
   a side of the sealing plate facing the guiding straight groove is provided with a plurality of recesses, and the plurality of recesses are distributed at intervals along the extending direction of the guiding straight groove, an opening cavity is provided at one side of the first stopping portion facing to the recess, a first elastic member is provided in the opening cavity, a limiting convex portion is movably provided at the opening of the opening cavity, two ends of the first elastic member are respectively abutted against a bottom of the opening cavity and the limiting convex portion, and the limiting convex portion is configured to be elastically clamped with any one of the recesses.

4. The quick-release plate assembly of claim 1, wherein a bottom of the sliding groove is provided with a scallop hole, the stopping portion comprises a second stopping portion rotatably arranged in the scallop hole, a center of the scallop hole is located at a rotating axis of the second stopping portion, when abutted against two side edges of the scallop hole, the second stopping portion is configured to abut against the abutting convex portions at different positions.

5. The quick-release plate assembly of claim 4, wherein a first rotating shaft is provided on the base adjacent to the center of the scallop hole, the second stopping portion comprises a main body portion and a rotating portion connected to the main body portion, the rotating portion is rotatably connected to the first rotating shaft at the side of the base back away from the sliding groove, and the main body portion passes through the scallop hole and protrudes from the sliding groove.

6. The quick-release plate assembly of claim 1, wherein a plurality of avoiding holes are provided at a bottom of the sliding groove, and the plurality of avoiding holes are distributed at intervals along a width direction of the sliding groove, the stopping portion comprises a plurality of third stopping portions, one of the third stopping portions is correspondingly telescopically inserted into one of the avoiding holes, at least one of the third stopping portions protrudes out of the avoiding hole to match the position of the corresponding abutting convex portion.

7. The quick-release plate assembly of claim 6, further comprising:
   a sealing plate arranged at the side of the base back away from the sliding groove,
   wherein an accommodating space is provided between the base and the sealing plate; and
   the third stopping portion is slidably connected to the avoiding hole, a second elastic member is provided between the third stopping portion and the sealing plate, two ends of the second elastic member are elastically abutted against the sealing plate and the third stopping portion respectively, to make the third stopping portion extend and retract in the avoiding hole.

8. The quick-release plate assembly of claim 7, further comprising:
a rotating rod,
wherein a second rotating shaft is provided between the sealing plate and the base, and a middle part of the rotating rod is rotatably connected to the second rotating shaft;
the stopping portion comprises two third stopping portions, and the two third stopping portions are respectively corresponding to the two ends of the rotating rod, and are respectively arranged at opposite ends of the rotating rod in a rotational circumferential direction of the rotating rod, the third stopping portion is provided with a first slot and a second slot distributed in a direction from the sealing plate to the base, the two ends of the rotating rod are protrudingly provided with clamping convex portions towards the third stopping portion in a rotating direction of the rotating rod, and a third elastic member is elastically abutted between a side of the rotating rod back away from the clamping convex portion and the base;
when one of the clamping convex portions of the rotating rod is clamped into a first slot of the third stopping portion, the other one of the clamping convex portions is correspondingly clamped into a second slot of the other third stopping portion.

9. The quick-release plate assembly of claim 1, further comprising:
a sealing plate arranged on the side of the base back away from the sliding groove,
wherein a clamping structure is provided on the base, and an accommodating groove is formed between the base and the sealing plate, a communicating port is opened on a wall of the sliding groove, the sliding groove is communicated with the accommodating groove through the communicating port, the clamping structure is arranged in the accommodating groove, and is configured to limit a position of the quick-release plate through the communicating port.

10. The quick-release plate assembly of claim 9, wherein the communicating port is provided with a first portion on a side wall of the sliding groove and a second portion on a bottom wall of the sliding groove, the clamping structure comprises a limiting member arranged at the communicating port, the limiting member is provided with a first abutting portion accommodated in the first portion and a second abutting portion accommodated in the second portion, an included angle is formed between the first abutting portion and the second abutting portion, and the limiting member is rotatably connected to the wall of the accommodating groove, to have a first state and a second state.

11. The quick-release plate assembly of claim 9, wherein the clamping structure further comprises a pushing rod, a first resetting spring and a second resetting spring;
one end of the pushing rod extends into the accommodating groove, and is configured to move in the accommodation groove;
two ends of the first resetting spring elastically abut against an opposite side of the pushing rod and the opposite side of the wall of the accommodation groove respectively, the elastic expansion and retraction direction of the first resetting spring is parallel to the moving direction of the pushing rod, and two ends of the second resetting spring elastically abut against the back side of the second abutting portion and the opposite side of the sealing plate respectively; and
one side of the limiting member towards the pushing rod is provided with a first clamping portion, the pushing rod is provided with a second clamping portion and a third slot in sequence in the moving direction of the pushing rod, and the second clamping portion is configured for abutting against the first clamping portion.

12. The quick-release plate assembly of claim 11, wherein a button is provided at the end of the pushing rod outside the accommodating groove, and the first clamping portion and the second abutting portion are respectively arranged at two opposite sides of a rotating shaft of the limiting member.

13. The quick-release plate assembly of claim 10, wherein the clamping structure further comprises a locking member, a side of the second abutting portion towards the communicating port is provided with a limiting slope, one end of the locking member protrudes from an edge of the base and is configured to move in the accommodation groove, and the other end of the locking member is configured to move closer to press the limiting slope, to press the first abutting portion tightly on the quick-release plate.

14. The quick-release plate assembly of claim 13, wherein the locking member comprises a top plate slidably connected to the base and a screw screwed to the side of the base, one end of the screw is connected with a knob, and the other end of the screw is configured for abutting against the top plate when the limiting member is in the first state, to make the top plate press against the limiting slope.

15. A tripod, comprising:
a tripod body; and
the quick-release plate assembly of claim 1,
wherein the quick-release plate assembly is arranged on a top of the tripod body.

* * * * *